(No Model.)
W. T. FORBES.
WOOL WASHING MACHINE.
No. 478,419. Patented July 5, 1892.
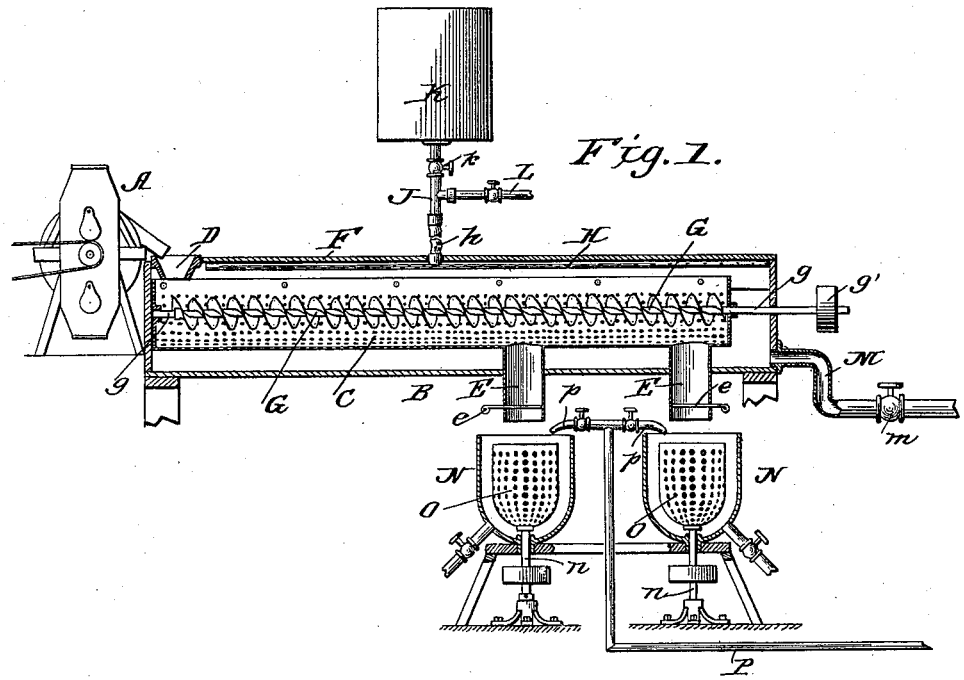
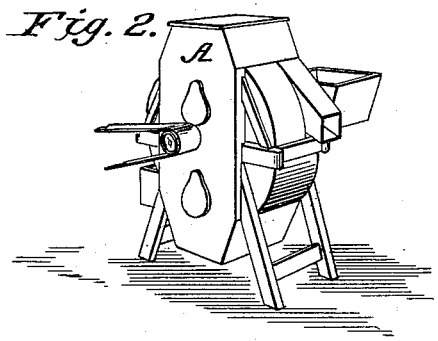
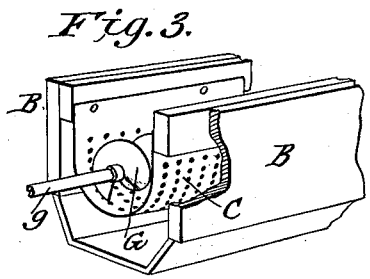
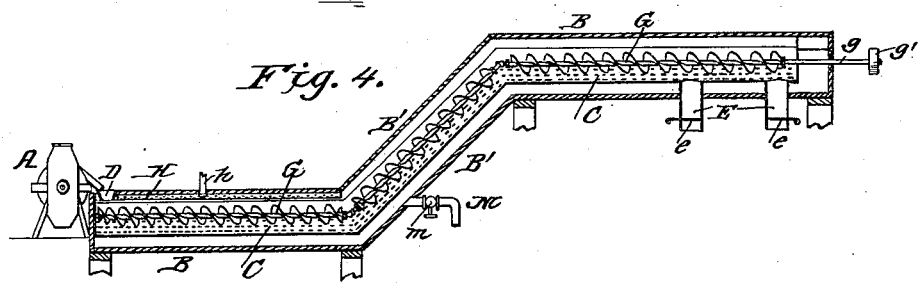
WITNESSES:
Fred G. Dieterich
M. D. Blondel
INVENTOR:
Walter T. Forbes.
BY
ATTORNEYS

UNITED STATES PATENT OFFICE.

WALTER T. FORBES, OF ATLANTA, GEORGIA, ASSIGNOR OF ONE-HALF TO JAMES F. LESTER, OF SAME PLACE.

WOOL-WASHING MACHINE.

SPECIFICATION forming part of Letters Patent No. 478,419, dated July 5, 1892.

Application filed November 19, 1891. Serial No. 412,448. (No model.)

*To all whom it may concern:*

Be it known that I, WALTER T. FORBES, residing at Atlanta, in the county of Fulton and State of Georgia, have invented an Improved Apparatus for Cleaning Wool, of which the following is a specification.

My invention has for its object to provide an improved apparatus for scouring fleece-wool, which will serve to quickly and effectively separate the dirt and greasy matter therefrom without injuring the natural qualities of the wool.

To these ends my invention consists in the apparatus hereinafter fully described in the specification, and pointed out in the claims, reference being had to the accompanying drawings, in which—

Figure 1 is a vertical longitudinal section of my improved wool-cleaning apparatus. Fig. 2 is a perspective view of the sand-extractor. Fig. 3 is a detail view of the conveyer hereinafter referred to, and Fig. 4 is a view of a modification hereinafter referred to.

In the accompanying drawings, A indicates a wool-sand extractor of any well-known construction, from which the wool is fed into a conveyer which consists of a box-like receptacle B, provided with a longitudinal perforated trough C, with the forward end of which communicates a feed-hopper D, into which the wool is discharged from the extractor A. The outer end of the trough is provided with depending pockets E E, which project down through the bottom of the box B, and which have cut-offs or slides $e\ e$ for a purpose hereinafter explained, the upper side of the said box B being held closed by a hinged door F, as shown.

G indicates a screw-conveyer, mounted in the trough C, the shaft $g$ of which is extended through the outer end of the box B, and is provided with a drive-pulley $g'$.

Extended the entire length of the box B, and disposed just below the cover F and centrally over the trough C, is a perforated pipe H, which pipe is connected by a flexible pipe-section $h$ with a feed-pipe J, connected with a scouring-solution holder or tank K. The pipe J has a valve $k$ at a point near the tank K, and with which a valved water-supply pipe L connects at a point below the valve $k$. M indicates a waste-pipe connected with the bottom of the box B and which is provided with a valve $m$, as shown.

N N indicate centrifugal washers located under the pockets E E, as shown in Fig. 1, each of which consists of a main chamber open at the top, in which is mounted on a vertical shaft $n$ a reticulated cylinder O, open at the top and formed with a concaved bottom, such cylinder being of a diameter somewhat less than the main chamber, as shown.

P indicates the water-supply pipe, which extends up between the centrifugal washers, and is formed with valved laterals $p\ p$, which project over the washers to discharge therein when the valves are opened.

By means of the apparatus shown I am enabled to clean fleece-wool by the following method: The dirty and greasy wool after it is fed from the extractor into the conveyer-trough is carried forward by the screw G, and as it moves along it is treated with a continuous spray of the scouring solution or a mixed solution of scour and water or clear water, as the condition of the wool may require, the wool as it is scoured being fed into the pockets E. After the wool has been sufficiently scoured the solution is turned off and the detergent, grease, and dirt is drawn off from the box B through the waste-pipe M. The gates $e$ in the pockets are then drawn and the scoured wool is dumped into the centrifugal washers where the scouring solution held in the wool is washed out and the wool thoroughly cleansed. After the scour solution is removed from the wool the mixed water and solution is drained off from the washers and the water-supply cut off; and as the reticulated washers continue in their revolution the centrifugal action serves to throw off all the liquor held in the wool, and thereby partially dries it preparatory to its removal.

The centrifugal washers may both be in operation at one time or one be in operation while the wool in the other is being removed.

By this apparatus I am enabled to clean a large quantity of wool in a very short time without the danger of forming it into buckshot or small lumps, as is usually the case when the wool is cleaned in the ordinary manner, thereby leaving it in its natural form and in a prime condition for carding.

In Fig. 4 I have shown a modified form of my apparatus. In this construction the box is formed into a lower receiving-section in which the scouring solution is held, an upper section in which the discharge-gates are located, and an intermediate upwardly-inclined section B', such sections having each a conveyer, which are geared together in any well-known manner. The spray extends over the lower or scouring-solution box, which box is also provided with an overflow-valve, as shown.

In operation the wool after it is subjected to the scouring solution in the lower box-section is drawn up out of the solution, carried up the inclined conveyer, in which the solution held by the wool is separated therefrom and passes back into the lower box-section. The wool being thus partially dried is carried into the upper box and delivered into the discharge gate or gates. It will thus be seen that in this construction undue waste of the scouring solution is prevented.

Having thus described my invention, what I claim, and desire to secure by Letters Patent, is—

1. A wool-cleaning apparatus comprising a box-like receptacle formed with a feed-opening at one end and discharge-openings in the bottom of its opposite end, a foraminated trough suspended in such box formed with discharge portions projected through the discharge-openings in the box, a conveyer journaled in said trough, adapted to convey the wool from the feed end to the discharge end of the box, a scour-holding tank, a spray-pipe located longitudinally over the trough, and a valved-pipe connection between said tank and the spray-pipe, all substantially as described, and for the purpose described.

2. An apparatus for cleaning wool, comprising a box-like receptacle adapted to hold the scour, a foraminated trough suspended in such tank, adapted to hold the wool, said trough having outlets E, provided with a gate e, and means for feeding the wool to such outlet, substantially as shown, of washers disposed to receive the wool from the outlet E, consisting of the chambers N, having each a foraminated trough O, mounted to rotate within the chamber N, the supply-pipe P, having a valved lateral projection into the chamber N, and means for operating the trough O, all as set forth, and for the purpose described.

3. In a wool-cleaning apparatus, in combination, a box-like receptacle comprising a lower section adapted to hold the scouring solution and provided with a feed-opening, an upper parallel section having discharge-openings, an inclined section connecting the upper and lower sections, conveyers mounted in the several box-sections, adapted to carry the wool through the scouring solution to the discharge-openings, and means for operating the conveyers, all substantially as and for the purpose described.

WALTER T. FORBES.

Witnesses:
F. M. SCOTT,
B. O. HOLLAND.